United States Patent [19]
Mita et al.

[11] Patent Number: 5,276,445
[45] Date of Patent: Jan. 4, 1994

[54] POLLING CONTROL SYSTEM FOR SWITCHING UNITS IN A PLURAL STAGE SWITCHING MATRIX

[75] Inventors: Michio Mita; Kimiyasu Sato, both of Kanagawa; Hidetoshi Nishimoto, Tokyo, all of Japan

[73] Assignee: Sony Corporation, Tokyo, Japan

[21] Appl. No.: 798,698

[22] Filed: Nov. 26, 1991

[30] Foreign Application Priority Data

| Nov. 30, 1990 | [JP] | Japan | 2-329622 |
| Nov. 30, 1990 | [JP] | Japan | 2-335573 |
| Nov. 30, 1990 | [JP] | Japan | 2-335574 |
| Nov. 30, 1990 | [JP] | Japan | 2-335575 |

[51] Int. Cl.$^5$ ............................................. H04Q 1/00
[52] U.S. Cl. ............................. 340/825.79; 340/825.8; 340/825.08; 340/825.36; 379/310
[58] Field of Search ........... 340/825.79, 825.8, 825.08, 340/826, 825.36; 370/54, 95.2, 85.08; 379/271, 284, 292, 310

[56] References Cited

U.S. PATENT DOCUMENTS

| 3,470,533 | 9/1969 | Tanner et al. | |
| 4,821,034 | 4/1989 | Anderson | 340/825.8 |
| 5,032,837 | 7/1991 | Yoshifuji | 340/825.8 |
| 5,107,489 | 4/1992 | Brown | 340/825.79 |
| 5,179,550 | 1/1993 | Simpson | 340/826 |

FOREIGN PATENT DOCUMENTS

0016397 10/1980 European Pat. Off.
0251868 1/1988 European Pat. Off.

Primary Examiner—Donald J. Yusko
Assistant Examiner—Brian Zimmerman
Attorney, Agent, or Firm—William S. Frommer; Alvin Sinderbrand

[57] ABSTRACT

A matrix switching apparatus includes a plurality of switching units connected in tandem, each switching unit having a plurality of input terminals and a plurality of output terminals. There are a plurality of transmission/reception units, each provided within a respective switching unit and also within a remote control unit. The transmission/reception units are for transmitting switching data. A first one of the transmission/reception units is set to a master station mode and sequentially polls the remaining transmission/reception units which are set to a slave station mode. The remaining units respond to the polling by outputting switching data, which is collectively transmitted by the master station over a serial busline. The remaining transmission/reception units receive only relevant data from the switching data transmitted over the serial busline and supply the relevant data to controlling units which control the turning on and off of crosspoint switches in the switching units.

10 Claims, 10 Drawing Sheets

| B3B2B1B0 | COMMAND CONTENTS |
|---|---|
| 0 0 0 0 | POLLING |
| 0 0 0 1 | NUMBER OF CROSS POINTS |
| 0 0 1 0 | NAME OF CROSS POINTS |
| 0 0 1 1 | DATA DEMAND BETWEEN MASTER AND SLAVE |
| 0 1 0 0 | DATA TRANSFER BETWEEN MASTER AND SLAVE |
| 0 1 0 1 | DATA REQUEST TO SLAVE VIA MASTER |
| 0 1 1 0 | DATA TRANSFER TO SLAVE VIA MASTER |
| 0 1 1 1 | DEMAND FOR RETRIEVAL OF INTERCONNECTION DATA (NAME) |
| 1 0 0 0 | DEMAND FOR RETRIEVAL OF INTERCONNECTION DATA (NUMBER) |
| 1 0 0 1 | RESULTS OF EXECUTION OF SWITCHING (NUMBER) |
| 1 0 1 0 | RESULTS OF EXECUTION OF SWITCHING (NAME) |
| 1 0 1 1 | TIME DATA SETTING DEMAND |
| 1 1 0 0 | TERMINAL COMMAND |
| 1 1 0 1 | ACK (AFFIRMATIVE RESPONSE) |
| 1 1 1 0 | NAK (NEGATIVE RESPONSE) |
| 1 1 1 1 | RESET |

FIG. 5

POLLING CONTROL SYSTEM FOR SWITCHING UNITS IN A PLURAL STAGE SWITCHING MATRIX

BACKGROUND OF THE INVENTION

1. Field of the Invention

This invention relates to a matrix switching apparatus for selectively outputting information signals supplied to a plurality of input terminals at desired output terminals. More particularly, it relates to a matrix switching apparatus made up of a plurality of switching units each including a plurality of input terminals and a plurality of output terminals.

2. Description of Related Art

In broadcasting stations or production studios producing television broadcast programs or video recordings, video and audio signals inputted to and outputted from a plurality of pieces of equipment such as VTRs, video disk recording/reproducing apparatus, audio tape recorders, disk recording and/or reproducing apparatus, microphones or television cameras, need to be switchingly selected in a desired manner for transmission. For example, a matrix switching apparatus, comprising a matrix array of a large number of switches, is provided between a plurality of editing rooms and a VTR chamber in which a large number of VTRs and a variety of recording/reproducing apparatus are densely installed so that on optionally selecting and controlling desired switches of the matrix switching apparatus, a desired piece of equipment or one not in use may be designated for use by a given editing room from a large number of pieces of equipment in the VTR chamber.

For such a matrix switching apparatus, the required matrix size varies depending on the overall system size and may be determined by, for example, the number of pieces of equipment to be in use or the number of editing rooms. There are cases wherein a large system with tens of input and output channels is required. It is, however, difficult for a single matrix switching apparatus to meet these varying requirements. For this reason, it has been proposed to construct a large matrix switching apparatus by using a plurality of small to medium size matrix switching units each comprising several to tens of channels, as proposed in U.S. patent application No. 07/674,890 previously filed in the name of the present Assignee.

FIG. 1 shows an example of a matrix switching apparatus made up of a plurality, herein four, of the above mentioned matrix switching units MSU to enhance the number of input and output terminals.

Each of the four matrix switching units $MSU_1$ to $MSU_4$ shown in FIG. 1 has 32 channels input terminals $TI_1$ to $TI_{32}$ and 32 channel output terminals $TO_1$ to $TO_{32}$ and switches arranged at crosspoints or points of intersection between extension lines of these input terminals $TI_1$ to $TI_{32}$ and extension lines of the output terminals $TO_1$ to $TO_{32}$ for providing a 32 x 32 switch matrix. Each of the matrix switching units $MSU_1$ to $MSU_4$ has 32 channel extension output terminals $EO_1$ to $EO_{32}$ and 32 channel extension input terminals $EI_1$ to $EI_{32}$. Using these four matrix switching units $MSU_1$ to $MSU_4$, the extension input terminals $EI_1$ to $EI_{32}$ of the matrix switching unit $MSU_1$ are connected to the output terminals $TO_1$ to $TO_{32}$ of the matrix switching unit $MSU_2$, the extension output terminals $EO_1$ to $EO_{32}$ of the matrix switching unit $MSU_1$ are connected to the input terminals $TI_1$ to $TI_{32}$ of the matrix switching unit $MSU_4$, the extension output terminals $EO_1$ to $EO_{32}$ of the matrix switching unit $MSU_2$ are connected to the input terminals $TI_1$ to $TO_{32}$ of the matrix switching unit $MSU_3$ and the extension output terminals $TO_1$ to $TO_{32}$ of the matrix switching unit $MSU_3$ are connected to the input terminals $TI_1$ to $TI_{32}$ of the matrix switching unit $MSU_4$ for providing a matrix switching apparatus having 64 channel input x 64 channel outputs. In this case, it suffices if 32 of the 64 channel inputs, namely the inputs $IN_1$ to $IN_{32}$, are supplied respectively to the input terminals $TI_1$ to $TI_{32}$ of the matrix switching unit $MSU_1$ and the remaining 32 channel inputs $IN_{33}$ to $IN_{64}$ are supplied respectively to the input terminals $TI_1$ to $TI_{32}$ of the matrix switching unit $MSU_2$, while 32 of the 64 outputs, namely the outputs $OUT_1$ to $OUT_{32}$, are taken out at the respective output terminals $TO_1$ to $TO_{32}$ of the matrix switching unit $MSU_1$ and the remaining 32 channel outputs $OUT_{33}$ to $OUT_{64}$ are taken out at the output terminals $TO_1$ to $TO_{32}$ of the matrix switcher unit $MSU_4$. It becomes possible in this manner to distribute the 64 channel inputs $IN_1$ to $IN_{64}$ so as to be taken out as 64 channel outputs $OUT_1$ to $OUT_{64}$.

In a conventional switching matrix apparatus, a remote control unit is provided for making or breaking respective crosspoint switches, and desired input and output signal routing (route switching) may be realized by actuating buttons or changeover levers on a control panel of the remote control unit. In a matrix switching apparatus having a plurality of matrix switching units, a plurality of the above mentioned remote control units are occasionally provided, in which case it becomes necessary to provide a signal configuration, that is a protocol or format, for exchanging control signals or the like between the matrix switching units and the remote control units.

Moreover, if several to less than twenty pieces of equipment are to be used, only one serial busline suffices for exchanging the control signals or the like. However, if signal transmission is to be made over a serial busline between tens to hundreds of pieces of equipment, response time or reliability may be lowered and an excessive waiting time may occur before actual signal route switching is achieved, or a special cable may need to be used because of an increased data error rate. If different communication functions of the units need to be provided, it is necessary to provide units performing these different communication functions by a painstaking and laborious operation.

Further, if the above described matrix switching apparatus is connected to, for example, an apparatus that receives digital signals, such as serial digital video signals, since the switching apparatus usually regenerates the input digital signals, it becomes necessary to change the clock frequency depending on the format of the input digital signals The clock signals are generated by a voltage-controlled oscillator (VCO) or the like. Supposing that a similar regenerating circuit is provided for waveforming at the output of each crosspoint switch of the matrix switcher apparatus, signals can not properly be outputted if the clock frequency at the input side differs from that at the output side.

Also in the above described matrix switching apparatus or a matrix switching apparatus composed of a plurality of matrix switching units, inspection of the switching states, that is, checking whether the switching operation of a large number of switches provided in a matrix configuration is performed properly is usually accomplished by monitoring output signals from the respective channels. For this reason, a signal is not outputted or transmitted due to defective switching operations of one of the switches of the matrix switching apparatus, which of the switches is out of order can be determined only by an extremely time-and labor-consuming operation.

It is noted that, in a system comprising interconnection of the above described conventional matrix switching apparatus and remote control units, failure to make a response to transmitted data within a predetermined time is considered to be a sign of the occurrence of a malfunction such as busline breakage or shorting of the transmission line. However, it is not possible with the conventional system to determine if the malfunction is ascribable to shorting or to breakage.

OBJECTS AND SUMMARY OF THE INVENTION

It is a principal object of the present invention to provide a matrix switching apparatus which is highly responsive in its input/output switching behavior.

It is another object of the present invention to provide a matrix switching apparatus by means of which mistaken operations may be prevented even when pieces of equipment handling different signal formats are connected to its input and output sides.

It is a further object of the present invention to provide a matrix switching apparatus capable of detecting malfunctions in circuitry or transmission lines and producing an alarm.

For accomplishing the above mentioned first object, the present invention provides a matrix switching apparatus comprising a plurality of switching units connected in tandem, each switching unit comprising a plurality of input terminals and a plurality of output terminals and crosspoint switches connected between the input terminals and output terminals, the apparatus comprising a plurality of controlling means each provided within a respective switching unit for controlling the turning on and off of the cross-point switches connected to the respective input and the output terminals, a remote control unit for transmitting switching data, a serial busline and a plurality of transmission/reception means each provided within the switching units and the remote control unit and connected to the busline for controlling transmission of the switching data between the switching unit and the remote control unit, a first one of the transmission /reception means being set to a master station mode and the remaining ones of said transmission/reception means being set to a slave station mode, the first one of the transmission/reception means sequentially polling the remaining ones of the transmission/reception to prompt output of switching data output by the polled transmission/reception means and for collectively transmitting the output switching data over the serial busline, the remaining ones of the transmission/reception means receiving only relevant data from the switching data transmitted over the serial busline and transmitting the relevant data to the controlling means.

For accomplishing the above mentioned second object, the present invention provides a matrix switching apparatus comprising a plurality of switching units connected in tandem, each switching unit comprising a plurality of input terminals and a plurality of output terminals and crosspoint switches connected between the input terminals and output terminals, the apparatus comprising a plurality of controlling means each provided within a respective switching unit for controlling the turning on and off of the cross-point switches connected to the respective input and output terminals, a remote control unit for transmitting switching data, a serial busline, and a plurality of transmission/reception means provided in the switching units and the remote central unit and connected to the busline for controlling transmission of the switching data between the switching units and the remote control unit, a first one of the transmission/reception means set to a master station mode sequentially polling the remaining transmission/reception means to prompt output of switching data by each transmission/reception means and collectively transmitting the stored switching data over the serial busline, the remaining transmission/reception means receiving only relevant data from the data transmitted by the first transmission/reception means over the serial busline and supplying the received data to their respective controlling means, a plurality of input signal format detection means each provided in a respective one of the switching units, the input signal format detection means detecting signal formats of external equipment respectively connected to each of the input terminals, a plurality of output signal format detection means each provided in a respective one of the switching units, the output signal format detection means detecting signal formats of external equipment respectively connected to each of the output terminals, and switch inhibition means, connected to the input and output signal format detection means, for inhibiting interconnection of respective input and output terminals when incompatible signal formats are detected on the terminals.

For accomplishing the third object of the present invention, the present invention provides a matrix switching apparatus comprising a plurality of switching units connected in tandem, each switching unit comprising a plurality of input terminals and a plurality of output terminals and crosspoint switches connected between the input terminals and output terminals, the apparatus comprising a plurality of controlling means each provided within a respective switching unit for controlling the turning on and off of the crosspoint switches connected to the respective input and output terminals, a remote control unit for transmitting switching data, a serial busline, a plurality of transmission/reception means provided in the switching units and in the remote control unit and connected to the busline for controlling transmission of switching data between the switching units and the remote control unit, a first one of the transmission/reception means set to a master station mode sequentially polling the remaining ones of said transmission/reception means set to a slave station mode to prompt output of switching data by the polled transmission/reception means and for collectively transmitting the output switching data over the serial busline, the remaining ones of the transmission/reception means set to said slave station mode receiving only relevant data from the switching data transmitted by the first transmission/reception means over the serial busline and supplying the received data to the controlling means, level detection means for detecting the signal level of the serial busline, comparator means for comparing the signal level detected by the detection means and a reference level, and alarm means responsive to the comparator means for issuing an alarm when the signal level differs from the reference level.

BRIEF DESCRIPTION OF THE DRAWINGS

FIG. 5 is a diagrammatic view showing examples of commands for communication data of the matrix switching apparatus shown in FIG. 2.

DETAILED DESCRIPTION OF THE PREFERRED EMBODIMENTS

Figure 1:
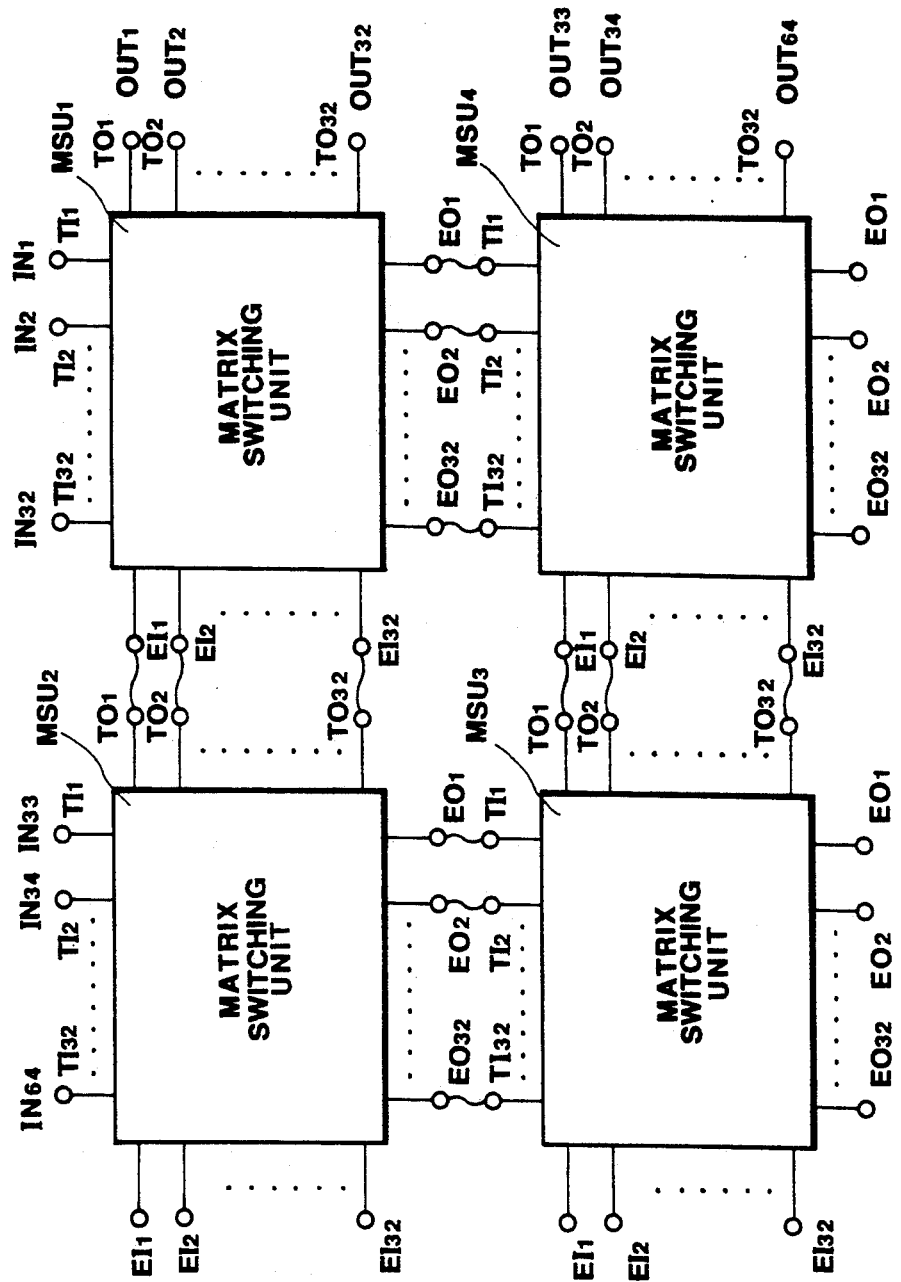
FIG. 1 is a schematic view showing a conventional matrix switching apparatus.
Figure 2:
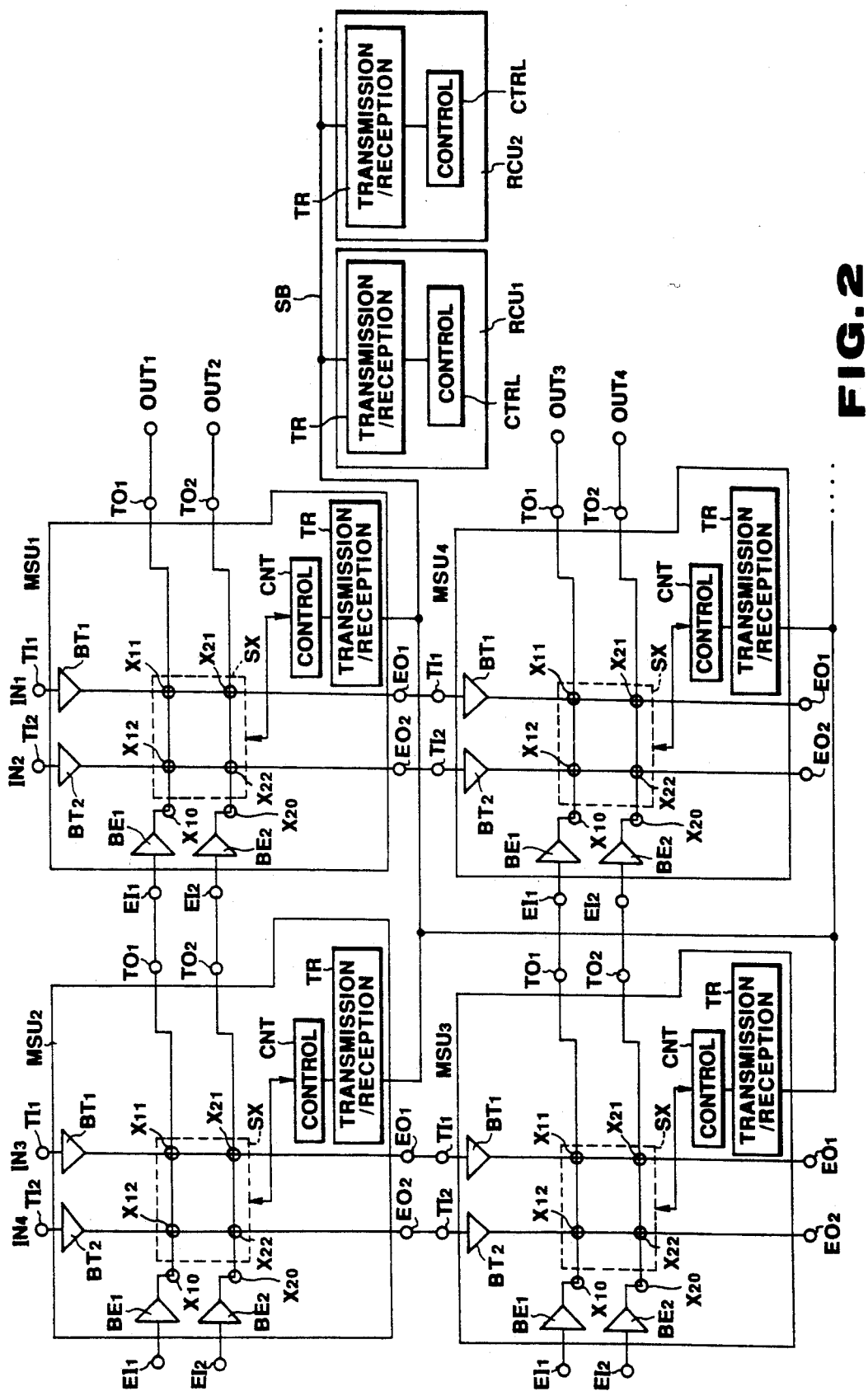
FIG. 2 is a block diagram showing an embodiment of a matrix switching apparatus according to the present invention.

FIG. 2 is a block circuit diagram showing a preferred embodiment of a matrix controlling switching control apparatus according to the present invention.

In this figure, a matrix switching unit MSU for selectively distributing inputs at m-channel input terminals $TI_1$ to $TI_m$ to n-channel outputs $TO_1$ to $TO_n$, where m and n are integers not less than 2 and are equal herein to 2, includes a switch matrix SX composed of crosspoint switches $X_{11}$ to $X_{nm}$, provided at the mx crosspoint, herein four switches $X_{11}$ to $X_{22}$, a control circuit CNT for on/off control of the switches $X_{11}$ to $X_{nm}$ of the switch matrix SX, and a transmission/reception circuit TR for communication of data, such as data relevant to the control operation of the control circuit CNT or status data including the status of the switch matrix SX, over an external serial busline SB. The matrix switching unit MSU also includes an m number of buffers $BT_1$ to $BT_m$ provided between the input terminals $TI_1$ to $TI_m$ and an m number of the switches $X_{11}$ to $X_{1m}$ on the input side of the switch matrix SX, herein two buffers $BT_1$ and $BT_2$, extension output terminals $EO_1$ to $EO_m$ connected to the output terminals of the buffers $BT_1$ and $BT_m$, herein two terminals $EO_1$ and $EO_2$, an n number of extension input terminals $EI_1$ to $EI_n$, herein two terminals $EI_1$ and $EI_2$, buffers $BE_1$ to $BE_n$, connected to these extension input terminals $EI_1$ to $EI_n$, herein buffers $BE_1$ to $BE_2$, and switches $X_{10}$ to $X_{n0}$ provided at the respective crosspoints between the buffers $BE_1$ and $BE_n$ and the output terminals $TO_1$ to $TO_n$, herein switches $X_{10}$ and $X_{20}$.

Using a plurality of the above described matrix switching units, herein four matrix switching units $MSU_1$ to $MSU_4$, the output terminals of one of the units may be connected to the extension input terminals of another unit, and the extension output terminals of the first unit to the input terminals of still another unit, for increasing the number of input and/or output channels and hence the system size.

In the present embodiment, shown in FIG. 2, a 4-channel input, 4-channel output matrix switching apparatus is provided by connecting extension input terminals $EI_1$ and $EI_2$ of matrix switching unit $MSU_1$ to output terminals $TO_1$ and $TO_2$ of matrix switching unit $MSU_2$, connecting extension output terminals $EO_1$ and $EO_2$ of matrix switching unit $MSU_1$ to input terminals $TI_1$ and $TI_2$ of matrix switching unit $MSU_4$, connecting extension output terminals $EO_1$ and $EO_2$ of the matrix switching unit $MSU_2$ to input terminals $TI_1$ and $TI_2$ of matrix switching unit $MSU_3$, and by connecting extension input terminals $EI_1$ and $EI_2$ of matrix switching unit $MSU_4$ to output terminals $TO_1$ and $TO_2$ of matrix switching unit $MSU_3$. Moreover, two of four channel inputs, namely the two channel inputs $IN_1$ and $IN_2$ are supplied to input terminals $TI_1$ and $TI_2$ of the matrix switching unit $MSU_1$ and the remaining two channel inputs $IN_3$ and $IN_4$ are supplied to the input terminals $TI_1$ and $TI_2$ of the matrix switching unit $MSU_2$, while two of four channel outputs, namely the two channel outputs $OUT_1$ and $OUT_2$, are taken out at output terminals $TO_1$ and $TO_2$ of matrix switching unit $MSU_1$ and the remaining two channels outputs $OUT_3$ and $OUT_4$ are taken out at output terminals $TO_1$ and $TO_2$ of matrix switching unit $MSU_4$.

At least one remote control unit RCU is provided for remote control of the matrix switching units MSU. In the present embodiment, shown in FIG. 2, two remote control units $RCU_1$ and $RCU_2$ are provided as shown. The remote control unit RCU is made up of a control circuit CTRL and a transmission/reception circuit TR. The transmission/reception circuit TR transmits and receives data to and from the serial busline SB, while the control circuit CTRL performs control operations in accordance with operating buttons provided on a panel of the remote control unit RCU or outputs data for display on a display unit in accordance with data exchanged by means of the transmission/reception circuit TR.

The data transfer format or communication protocol on the above mentioned serial busline SB will now be explained.

As network belonging to local area network (LAN), is employed, which allows for efficient operation even with a low level of performance of e.g. a transmission distance of 500 m and a data rate of 307 kbps. The network has a bus construction and its transmission line is a coaxial cable. The transmission/reception circuits of the above mentioned matrix switching units and remote control units are connected as terminals to the transmission line which is utilized on a time division basis.

Figure 3:
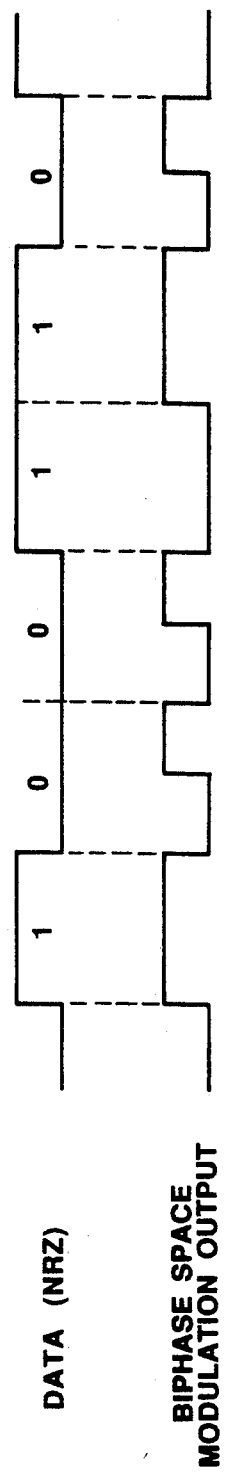
FIG. 3 is a wave form diagram for illustrating a communication data modulation system of the matrix switching apparatus shown in FIG. 2

The modulation system is a so-called biphase space modulation system in which inversion or transition necessarily occurs at a boundary between data bits and at the center of the data "0" bit, as shown in FIG. 3. The electrical signal is $2V \pm 0.5V$ (terminated by 75 ohms) and a 75 ohm connector of the T type BNC is used, with an input impedance of 57 ohms/27 kiloohms.

From the viewpoint of data communication, the matrix switching units MSU and the remote control units RCU, particularly the transmission/reception circuits TR of these units, as shown in FIG. 2, are divided into primary and secondary (master and slave) stations or units. The primary station performs data link control and is responsible for error control and restoration on the link level, while the secondary station executes control contents of the data link under commands from the primary station. Only one of the units connected to the busline SB is the primary station, while the remaining stations are secondary stations. The primary station sequentially addresses the transmission/reception circuits TR of the units or stations to place a request for data transmission, stores communication data transmitted from those units which have data ready for transmission, and transmits the stored data collectively, while the transmission/reception circuits TR of the respective units only receive those communication data which have been transmitted from the primary station and which have relevance to these units. In this manner, data communication over busline SB is controlled entirely by the primary station to improve efficiency of use of busline SB. The primary station manages the communication data including information data such as switching commands from the remote control unit or switching reports sent from the matrix switching units without directly controlling the units.

With the present embodiment, the matrix switching units MSU and the remote control units RCU are each provided with a primary station/secondary station changeover switch which may be turned to the primary position or to the secondary position to convert the transmission/reception circuits TR of the units MSU or RCU into a primary station or a secondary station, respectively. Among the units connected to the common busline SB, only one of the units is switched or set to the primary station mode and the remaining units are switched or set to the secondary station mode.

Figure 4:
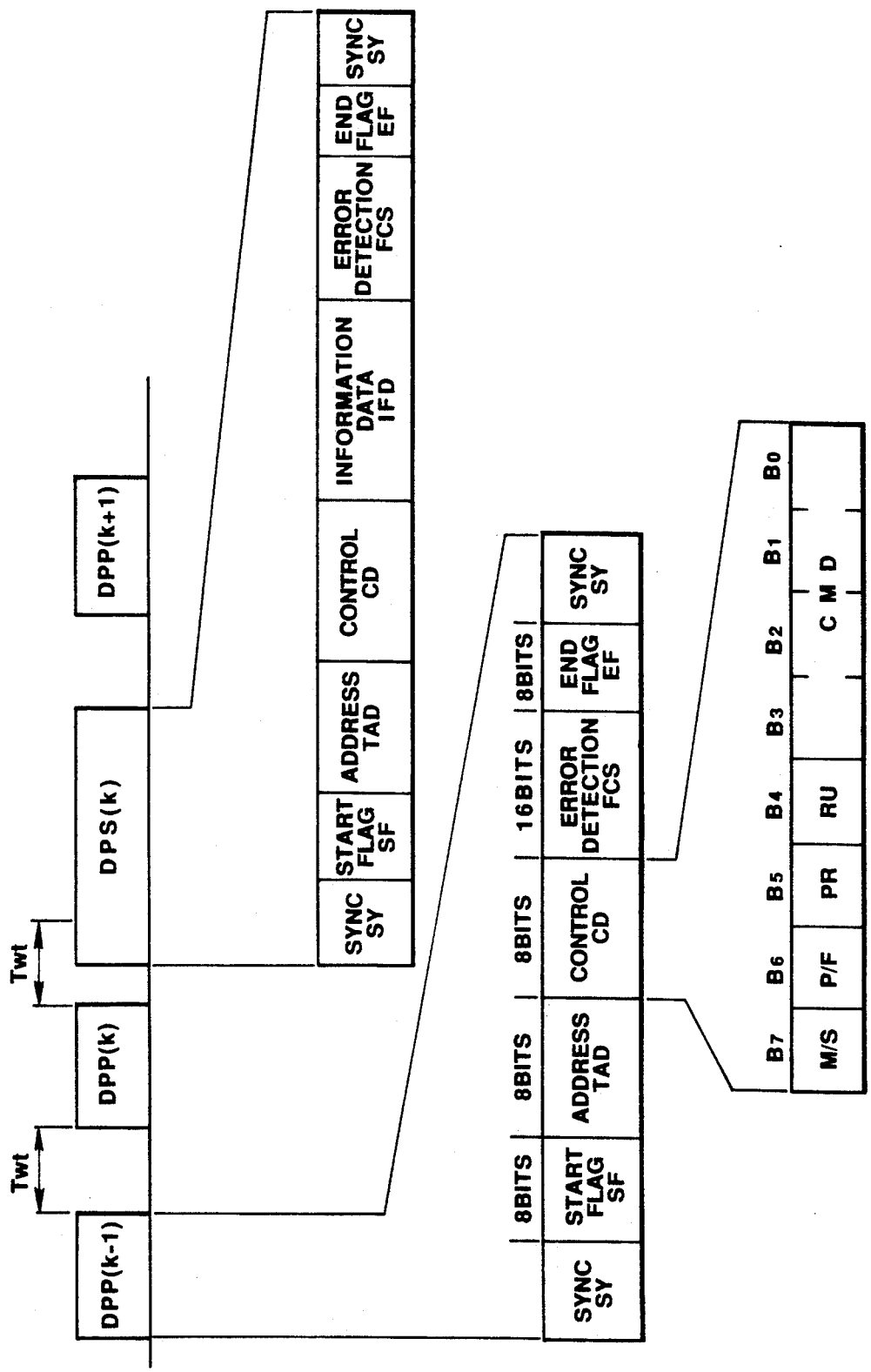
FIG. 4 is a diagrammatic view showing a communication data format of the matrix switching apparatus shown in FIG. 2.

FIG. 4 shows, as a concrete example of a signal transmitted over the serial busline, a signal format for a case in which all of the units are sequentially prompted by the primary station for data transmission by way of polling and the designated unit has data stored for transmission.

It is noted that a series of addresses, that is unit addressed or station addresses, are assigned to the units, namely the above mentioned matrix switcher units and the remote control units. As an example of address assignment, the primary station is assigned address 1 and addresses 2 etc. are assigned to the secondary stations in such a manner that no two stations in the same data link bear the same address. Only the station having the address specified in the destination address portion of the communication data receives the communication data. As specific addresses, and address 0 is a no-station address and an address bearing the maximum number, such as an address 255 in case of an 8-bit address, is a global address. The no-station address is an address to which none of the station responds and which may be used during network testing. The global address is an address to permit the data bearing the address to be received by all of the stations connected to the common busline.

FIG. 4 shows a communication data packet DPP for a set of polling operations performed under control of the primary station and a communication data packet DPS sent from the secondary station in response to the polling. A packet herein means a unit block used in data communication. The polling operation is an operation designating a station address of a unit or station connected to the busline to prompt the unit to transmit its data while simultaneously authorizing the unit to use the busline. In the absence of reply during a predetermined waiting time $T_{wt}$, the station address is updated to proceed to poll the next station to sequentially designate all of the units connected to the busline for inquiry. In this case, polling to the primary station itself is performed in the primary unit (primary station) itself and the communication data packet DPP for polling the primary station is not sent over the busline SB.

In FIG. 4, a communication data packet DPP(k) designates a packet or block when a station corresponding to address k is designated during polling. The unit (secondary station) bearing address k has data in store for communication and communication data packet DPS is sent over the busline within the waiting time $T_{wt}$. The transmission data packet DPP(k) for polling consists, from the leading end on, of a synchronizing bit string SY, and 8-bit start flag SF, an 8-bit destination address TAD, 8-bit control data CD, a 16-bit error detection code FCS, an 8-bit end flag EF and a synchronizing bit string SY. The leading and trailing bit strings SY each consist of 10 to 16 bits. On the other hand, the communication data packet DPS from the secondary station or packets containing information data in general have N-bit information data IFD between the control data CD and the error detection code FCS of packet DPS. The N-bit information data IFN may consist of any desired number of 8-bit bytes, except that the maximum amount of data contained between the flags SF and EF within one packet or block is limited to, for example, 256 bytes, and a set of information data in excess of the limit is divided into a plurality of blocks or packets for transmission.

As a specific example of the contents of control data CD, the most significant bit (MSB) $B_7$ is a master/slave bit M/S for indicating whether the data is from the primary station or a secondary station, and the second significant bit $B_6$ is a data continuity bit P/F for indicating whether the block is the last of the blocks into which the above set of data has been divided. If the communication data is that from the primary station or from a secondary station, the M/S bit becomes "1" or "0", respectively. If the block is other than or is the last one of the blocks, the P/F bit becomes "1" or "0" respectively. The third most significant bit $B_5$ is a protect demand bit PR and the fourth most significant bit $B_4$ is for indicating whether the block is applied to the matrix switching. The remaining four bits $B_3$ to $B_0$ are associated with commands CMD shown in FIG. 5.

In FIG. 5, the polling command corresponds to the least significant four bits of control data CD of the communication data packet DPP at the time of polling and is outputted only by the primary station. The secondary station designated by the address of destination TAD acquires the right to use the serial busline SB. The designated secondary station has to respond within the above mentioned waiting time $T_{wt}$ and, if the waiting time has expired, the primary station proceeds to poll the next secondary station. The crosspoint number and designation commands indicate that the next following data are the crosspoint number and designation. Data that may be exchanged at the time of data demand or data transfer between the primary and the secondary or to a secondary via primary consist of, for example, 8192 bytes and, if it is desired to transmit data in excess of the upper limit for one packet, such as 256 bytes, the data is divided into a plurality of sections for transmission. Data demand or data transmission between the secondary stations is effected by means of the primary station.

There are also a prescribed interconnection data retrieval demand command (designation and number), a switching execution result command (designation and number), a time data setting demand command, a terminal command, AKC (acknowledge) command, NAK (not acknowledge) command and a reset command.

Turning again to FIG. 4, the primary station sends out the above mentioned communication data packet for polling DPP over serial busline SB or a data link. Since the M/S bit of control data CD of the packet DPP is "1", only the station bearing the address designated by destination address TAD receives the data for execution. Supposing that a communication data packet DPP(k) having the destination address k is sent out and the secondary station bearing the corresponding address k contains information data for communication, such as demand or results of switching, the secondary bearing the address k sends out communication data packet DPS(k) containing the information data over the busline SB during the time from the end of transmission of the packet DPP(k) until the expiration of the waiting time $T_{wr}$. In general, the M/S bit of control data CD of communication data packet DPS from the secondary station is "0" to permit only the primary station to receive data while inhibiting data reception directly by the secondary station. The primary station stores the received data in storage means such as RAM to hold it until the end of polling of all of the secondary stations. After the end of a series of the polling operations, the primary station packets the stored data for each station to transmit the resulting data packet. The M/S bit of the communication data packet is "1" at this time so that the data may be received by the station designated by the destination address TAD. After transmission of all of the stored data, polling of the secondary stations resumes as described above.

It will be seen from the above that data transmission between the units is always performed with the primary station as a party to the communication and transmission to or reception by a given station is performed at a rate of one packet at a time, so that the waiting time for transmission and reception may be reduced for any of the stations. That, is supposing that the duration of the communication data packet for polling DPP is 300 µs to 400 µs, and the waiting time $T_{wr}$ is 100 µs to 200 µs, the time necessary for polling one station is about 500 µs, so that the polling time for 200 stations is 100 ms in the absence of transmission of communication data from the secondary station(s). Thus, for realizing a response of, for example, 500 ms, it suffices to limit the information data communication time between the secondary stations and the primary station to 400 ms (200 ms if the data transmission is only in one direction). Thus, with the mean time duration for transmission of an information data communication packet of, for example, 5 ms, information data transmission demands raised by about 40 stations simultaneously may be handled. When inquiry as to the presence or absence of information data is made at a period of 500 ms, it occurs only rarely that as many as forty stations or units have data in store for transmission. The number of stations that can be handled simultaneously may, of course, be increased further by increasing the response time beyond 500 ms.

The communication data transmitted from the respective units during the polling of all of the units is a mixture of various data, such as switching demand data, data showing the result of switching, inquiry data or response data. Data relevant to a given control operation, such as the demand for, response to, or results of execution of a control operation, are transmitted by a data packet at one time for each round of polling, so that the operation of other equipment is not halted until termination of the control operation and each item of equipment is accessed once during a period of polling of all of the units. In this manner, the response performance and the efficiency of use of the busline as a whole may be improved.

Since all of the secondary stations may become aware of the data outputted from the primary station, the secondary stations may grasp the operations performed by the other secondary stations.

Since the primary station only stores and collectively transmits the communication data, the primary station may be simplified in structure and produced at reduced costs.

Figure 6:
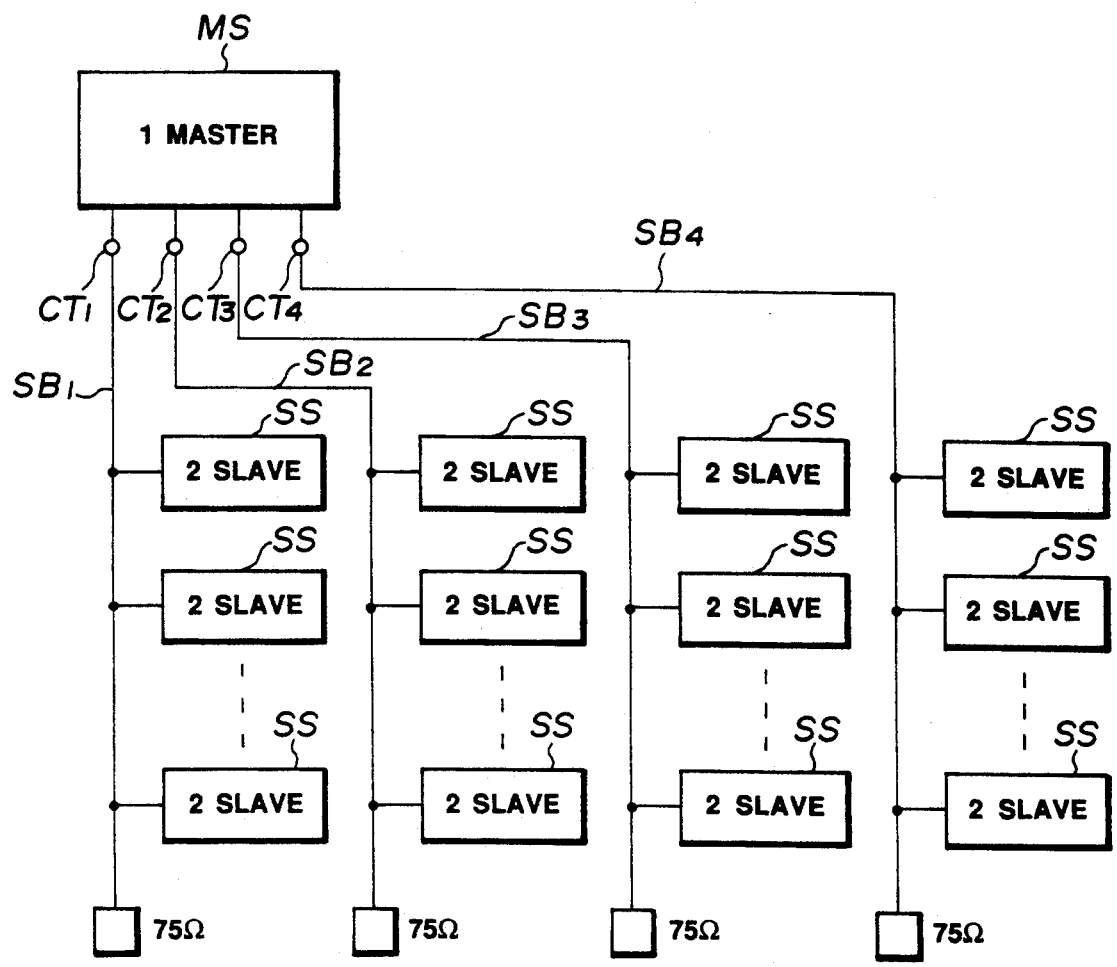
FIG. 6 is a block diagram illustrating the interconnections between master and slave stations of the matrix switching apparatus shown in FIG. 2.

FIG. 6 shows a concrete example of interconnection between on primary station MS and a plurality of secondary stations SS. The primary station MS shown in FIG. 4 is provided with four connector terminals $CT_1$ to $CT_4$ which may be connected to, for example, four serial buslines $SB_1$ to $SB_4$. The serial buslines $SB_1$ to $SB_4$ connected to these connector terminals $CT_1$ to $CT_4$ are of the same level without having any rank of priority so that a sole serial busline loop is constituted by all of the connector terminals. If the unit adapted for switching between primary and secondary station are modes, only one of the plurality of the connector terminals of units operating as secondary stations is used and the remaining terminals are not used.

The present invention is not limited to the above described embodiments. For example, although a matrix switching control apparatus making use of matrix switching control units and remote control units has been explained in the foregoing, the present invention may also be applied to a system connected to various other units, such as data display units. The signal format is not limited to the embodiment of FIG. 4, while the control data or the commands are also not limited to those shown above.

It will be seen from the foregoing that, with the matrix switching apparatus of the present invention, the matrix switching units and the remote control units are provided with transmission/reception circuits for transmitting communication data over the serial busline. The transmission/reception circuits are divided into a primary or master station and a plurality of remaining secondary or slave stations. The primary or master station manages data communication by sequentially all of the units or stations connected to the serial busline to prompt data transmission and then collectively transmitting to the remaining units the data that was transmitted as a result of the polling. In this manner, the number of the units or stations may be increased without affecting the time of operation or execution, while data communication between the units may be performed efficiently with improved response performance and system construction may be simplified because the primary station need only manage the communications.

On the other hand, since the communication mode of the units may be occasionally switched to the primary or secondary mode, there is no need to provide the respective units with predetermined functions. The primary unit may be of a simplified construction because it needs only to put the data into order.

Moreover, by dividing transmission/reception circuits in the matrix switching units and the remote control unit into a primary station for collectively outputting the communication data of the units and the remaining plural stations, and by providing, in each block or packet of communication data into which a series of communication data are divided for transmission over the serial busline, at least a primary/secondary bit and a bit for indicting whether the block is the last block, data communication between the units by means of the primary station may be improved in efficiency and a highly responsive switch control operation may be achieved even with low performance transmission lines.

Figure 7:
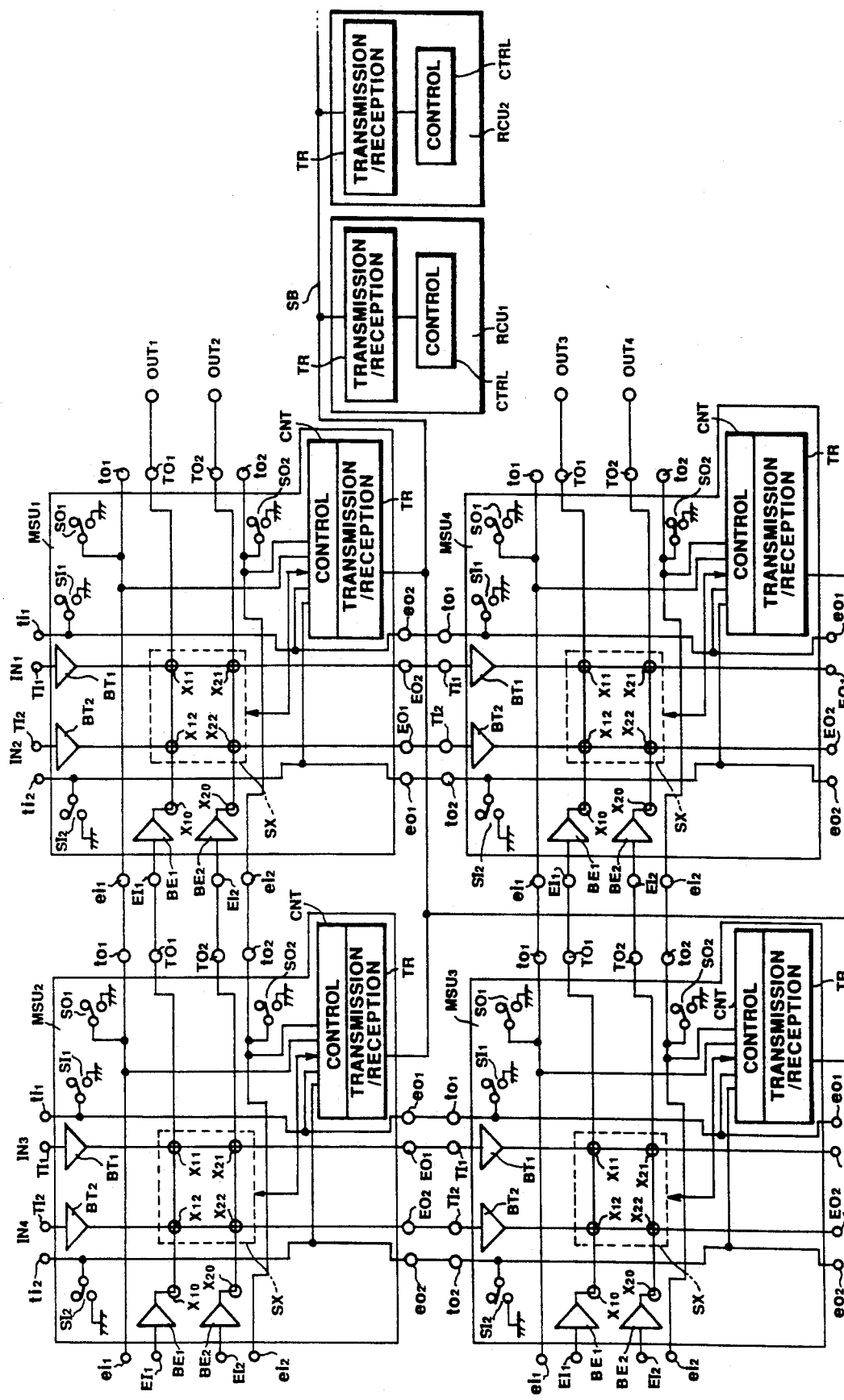
FIG. 7 is a block diagram showing a modified embodiment of the matrix switching apparatus of the present invention.

Referring now to FIG. 7, a modified embodiment of the present invention will be explained. The parts of components which are the same as those of the embodiment shown in FIG. 2 are denoted by the same reference numerals and the corresponding description is omitted for simplicity.

Each matrix switching unit MSU in FIG. 7 also includes input format changeover switches $SI_1$ to $SI_m$, herein two input format changeover switches $SI_1$ and $SI_2$, switched in accordance with the signal format of input digital signals supplied to the input terminals $TI_1$ and $TI_m$, and output format changeover switches $SO_1$ and $SO_2$, herein output format changeover switches $SO_1$ and $SO_2$, switched in accordance with the signal format used in various pieces of equipment connected to the downstream side of the output terminals $TO_1$ to $TO_n$. On of the fixed terminals of each of these input and output format changeover switches is grounded, while the other of the fixed terminals is designed as an open terminal. A common movable terminal of each of the input format changeover switches $SI_1$ and $SI_2$ is connected to format indicating signal input terminals $ti_1$ to $ti_m$, herein two terminals $ti_1$ and $ti_2$, while a common movable terminal of each of the output format changeover switches $SO_1$ and $SO_2$ is connected to format indicating signal output terminals $to_1$ to $to_n$, herein two terminals $to_1$ and $to_2$. The format indicating signal is normally at a high level and, when the input and output signals of the respective channels are of a first signal format or of a second signal format different from the first signal format, the format indicating signal goes to a high level or to a low level, respectively, thereby distinguishing the two formats of the input digital signals from each other. Level switching of the format indicating signal is achieved by switching of the format changeover switches $SI_1$, $SI_2$, $SO_1$ and $SO_2$. Alternatively, the format indicating signal may be normally low signal, in which case each of the input and output format changeover switches has one of its fixed terminals connected to a high level voltage source and its other fixed contract arranged as an open contract. Although two signal formats are provided in the embodiment of FIG. 7, a larger number of signal formats may also be accommodated. In such case, a multi-bit format indicating signal may be provided in association with a larger number of formats instead of the two state format changeover switches. As another alternative, the format changeover switches may be provided with a larger number of fixed terminals capable of assuming different levels in association with the different formats. Furthermore, a detection circuit for detecting the formats of input digital signals may be annexed to the apparatus of the present embodiment so that the input format changeover switches may be automatically switched responsive to format detection signals from the format detection circuit.

The format indicating signals described above are supplied to the control CNT which, if the signal format set at a given channel input differs from that set at a given channel output, outputs control data inhibiting connection of switches at the corresponding crosspoint in response to the format indicating signals supplied thereto. It is now assumed that, in FIG. 7, the channel inputs $IN_1$ and $IN_4$ are switched to a serial digital signal of the first signal format, the channel inputs $IN_2$ and $IN_3$ are switched to the second signal format, the channel outputs $OUT_1$ and $OUT_2$ are switched to the second signal format and the channel outputs $OUT_3$ and $OUT_4$ are switched to the first signal format. In such case, the signal formats at the switches $X_{11}$ and $X_{21}$ of the matrix switcher unit $MSU_1$, switches $X_{12}$ and $X_{22}$ of the matrix switcher unit $MSU_2$, crosspoint switches $X_{11}$ and $X_{21}$ of the matrix switcher unit $MSU_3$ and switches $X_{12}$ and $X_{22}$ of the matrix switcher unit $MSU_4$ differ from one another. If the signals of the different signal formats are connected to one another, normal signals can not be produced, that is, in the case of image signals, for example, proper images can not be produced. For this reason, switching of the switches in this case is inhibited by the control circuit CNT.

Figure 8:
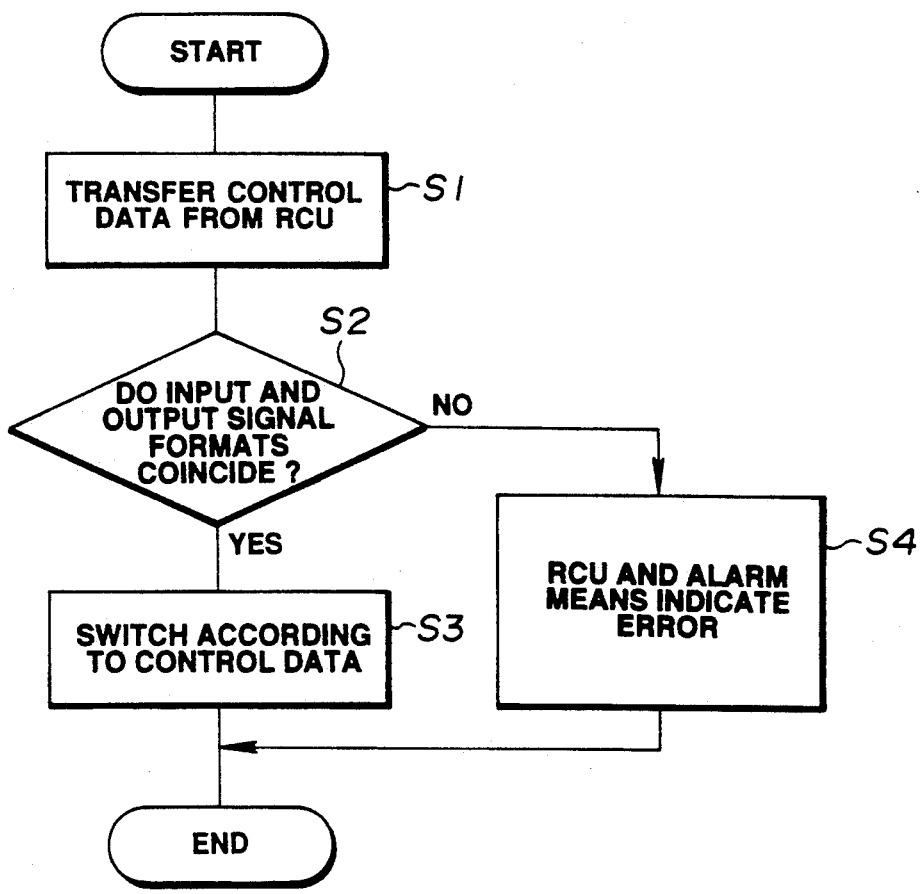
FIG. 8 is a flow chart showing the operation of a circuit for inhibiting improper connection of external equipment the matrix switching apparatus of the present invention.

A signal flow chart for a switching inhibiting operation performed at the control circuit CNT is shown in FIG. 8. Referring to this flow chart, control data for changeover control of the receptive switches of the switch matrix SX are supplied at step S1 from a remote control unit RCU which will be explained later. At step S2, it is determined for each of the respective switches, on the basis of the format indicating signals, if the format at the input coincides with the format at the output. If the result at step S2 is affirmative, that is if the input format coincides with the output format, control proceeds to step S3. Switching of the respective switch is performed at step S3 in accordance with the control data. If the result of step S2 is negative, that is if the input format differs from the output format, control proceeds to step S4. At step S4, switching of the respective switch is inhibited, while data to the effect that switching has been inhibited is sent to the remote control unit RCU. The remote control unit includes an audible or visual alarm (including, perhaps, a character or image display) to advise the operator of a format error.

Thus, in the present embodiment, if the input side format differs from the output side format, switching of corresponding switch(es) is inhibited to prevent the occurrence of switching errors.

It will be understood that input terminals $ti_1$ and $ti_2$ for format indicating signals are connected to corresponding extension output terminals $eo_1$ and $eo_2$ for format indicating signals, while output terminals $to_1$ and $to_2$ for format indicating signals are connected to corresponding extension input terminals $ei_1$ and $ei_2$ for format indicating signals.

Using a plurality of the above described matrix switching units, herein four matrix switching units $MSU_1$ to $MSU_4$, the output terminals of one of the units may be connected to the extension input terminals of another unit and the extension output terminals of the first unit to the input terminals of still another unit to increase the number of input and/or output channels and hence the system size.

With the above described matrix switching apparatus of the present invention, if the signal format set at a given one of the inputs differs from that set at a given output, connection of the corresponding switch within the matrix switching unit is inhibited to prevent a switching error which might otherwise lead to coupling of signals with different formats.

Figure 9:
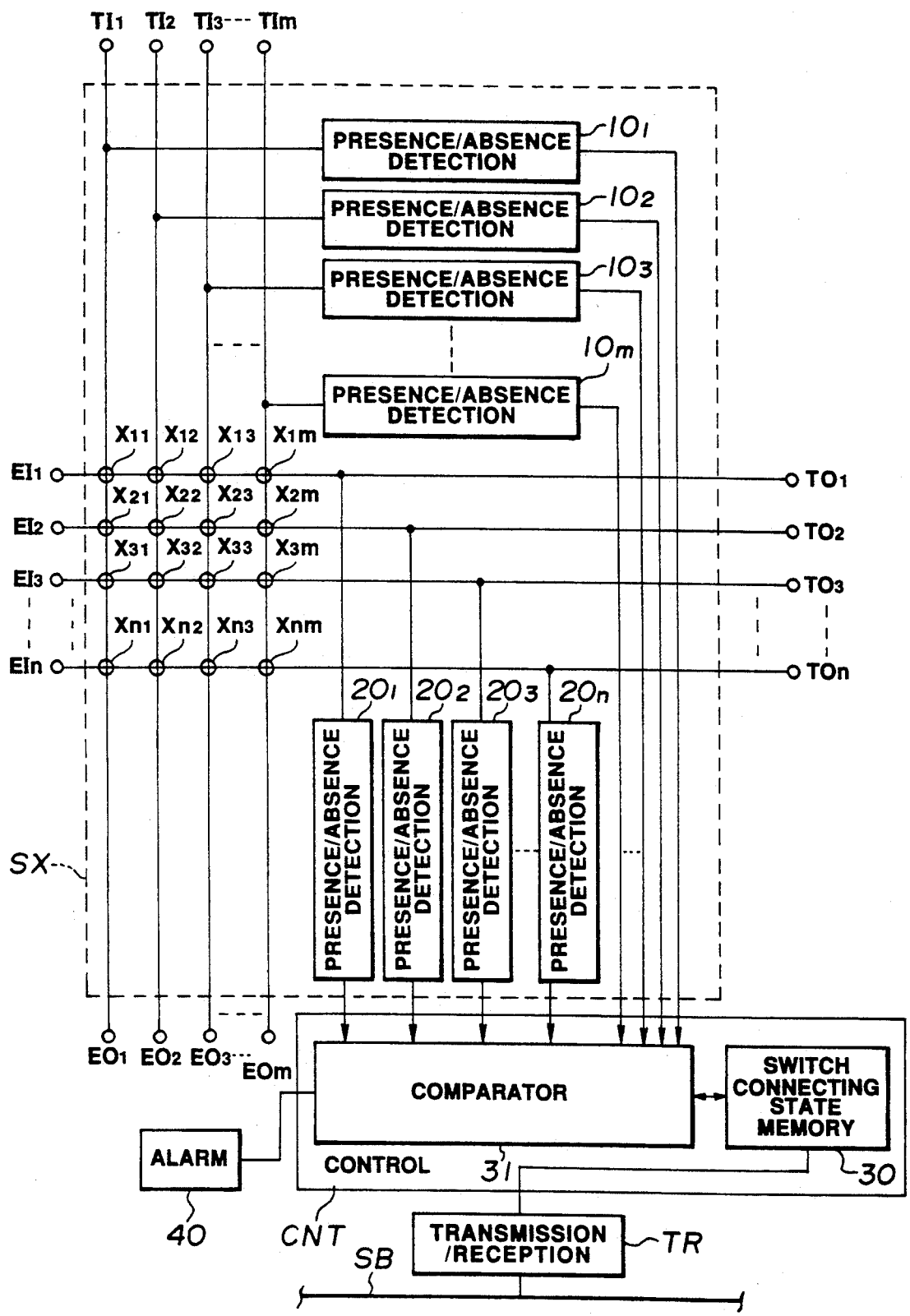
FIG. 9 diagram showing an embodiment of a self-diagnosis circuit of the matrix switching apparatus of the present invention.

Referring to FIG. 9, there will now be explained a self-diagnosis circuit for trouble shooting of the switch matrix SX of the matrix switching apparatus of the present invention shown in FIGS. 2 and 7. Although the switch matrix SX shown in FIGS. 2 and 7 is of the 2-input- and 2-output type, explanation will be made for the case of a m-input and n-output type switch matrix.

Referring to FIG. 9, a matrix switching unit for distributing inputs at m channel input terminals $TI_1$ to $TI_m$ to n channel output terminals $TO_1$ to $TO_n$ in a desired manner includes a switch matrix SX composed of switches $X_{11}$ to $X_{nm}$ provided at m x n crosspoints, a control circuit CNT for on/off control of the switches $X_{11}$ to $X_{nm}$ of the switch matrix SX and a transmission/reception circuit TR for communication over serial busline SB of data relevant to control operations of control circuit CNT and other data such as data concerning the status of the switch matrix. The present matrix switching unit also includes m extension output terminals $EO_1$ to $EO_m$ and n extension input terminals $EI_1$ to $EI_n$.

Switch matrix SX includes presence/absence detection circuits $10_1$ to $10_m$ and $20_1$ to $20_n$ for determining the presence or absence of signals in each of the inputs at the input terminals $TI_1$ to $TI_m$ and in each of the output terminals $TO_1$ to $TO_n$. Control circuit CNT of the switch matrix SX determines the switching states of the switches $X_{11}$ to $X_{nm}$ of the switch matrix SX based on outputs from the presence/absence detection circuits $10_1$ to $10_m$ and $20_1$ to $20_n$.

Referring to FIG. 9, control circuit CNT performs on/off control of the switches $X_{11}$ to $X_{nm}$ of the switch matrix SX based on control data transmitted from or received by the transmission/reception circuit TR over external serial busline SB. The control data or the like transmitted to the control circuit CNT are temporarily in a memory 30. Data indicating the switching sates of the switches $X_{11}$ to $X_{nm}$ in the switch matrix SX are also stored in memory 30. These data indicating the switching states are subsequently transmitted to the external serial busline SB via transmission/reception circuit TR.

When switches $X_{11}$ to $X_{nm}$ of the switch matrix SX are controlled in accordance with the control data, malfunctions may occur at one or more switches. That is, it may occur that, in spite of malfunctions at one or more switches, the data indicating the switching states of the switches $X_{11}$ to $X_{nm}$ incorrectly show switching in accordance with the aforementioned control data. Should there arise such switching malfunctions an output corresponding to an input can not be obtained.

Thus, in the present embodiment, presence or absence of signals in the associated inputs and outputs is detected at the presence/absence detection circuits $10_1$ to $10_m$ and $20_1$ to $20_n$ for detecting a case in which, while signals should exist at both the input and the output, there exists a signal only at one or the other of the input and the output. That is, the presence/absence detection circuits $10_1$ to $10_m$ and $20_1$ to $20_n$ detect if signals exist at the respective inputs and outputs and provide respective detection signals. For the detection signal, it is sufficient to provide a signal format that indicates presence or absence of a signal. For example, signal presence or absence may be indicated by a logic value "1" or "0", respectively, or vice versa.

The detection signals are supplied to a comparator 31 of control circuit CNT, to which the aforementioned control data stored in the memory 30 are also transmitted. In the comparator 31, the aforementioned control data, that is data indicating desired switching states, are compared to the detection signals from the presence/absence detection circuits $10_1$ to $10_m$ and $20_1$ to $20_n$. Should the control data differ from the corresponding detection signals at the corresponding input and output, there are outputted a signal indicating the occurrence of a switching malfunction and a signal indicating which of the switches has malfunctioned. Similarly, should the control data be the same as the corresponding detection signal at the corresponding input and output, a signal indicating normal switching operation is outputted. In other words, the comparator 31 outputs a signal indicating a normal operating state when the detection signals from the input and the output designated by the control data both indicate "signal presence" or "signal absence", and outputs a signal indicating a malfunction when one of the detection signals indicates "signal presence" and the other indicates "signal absence". These output signals are temporarily stored in the memory 30 before being transmitted via transmission/reception circuit TR to external serial busline SB.

An alarm device 40 may be connected to the matrix switching apparatus to inform the operator of the occurrence of switching malfunctions by, for example, a visual or audible alarm whenever such switching malfunctions have been detected by the comparator 31. In this way, switching malfunctions may be immediately recognized. As an example of a visual alarm for switching malfunctions provided by alarm device 40, a malfunction may be indicated by a red LED and normal switching operation may be indicated by a green LED.

With the above described matrix switching apparatus of the present embodiment, signal presence or absence at the multichannel inputs and outputs of the matrix switching unit may be detected by presence/absence detection circuits $10_1$ to $10_m$ and $20_1$ to $20_n$ and the switching states at the input and the output are determined by comparator 31 based on the detection signals to permit self-diagnosis so that points of trouble or malfunctions in switching may be located easily. Therefore, in a matrix switching apparatus including a plurality of matrix switching units MSU, those units or switches which are malfunctioning may be located promptly for early repair by exchange of substrates for example. Although the data indicating the switching state at the respective switches are transmitted in the above embodiment to the control circuit CNT, switching errors may be detected with the present embodiment, even if data indicating these errors are not available or if the data are not used or transmitted.

In this manner, with the matrix switching apparatus of the present invention, by determining whether or not there is a signal at each of the inputs and outputs the matrix switching units, the switching states of the respective switches may be determined easily in order to locate malfunctions. Thus, malfunctioning units or switches may be located quickly even with a matrix switching apparatus composed of plural matrix switching units.

Figure 10:
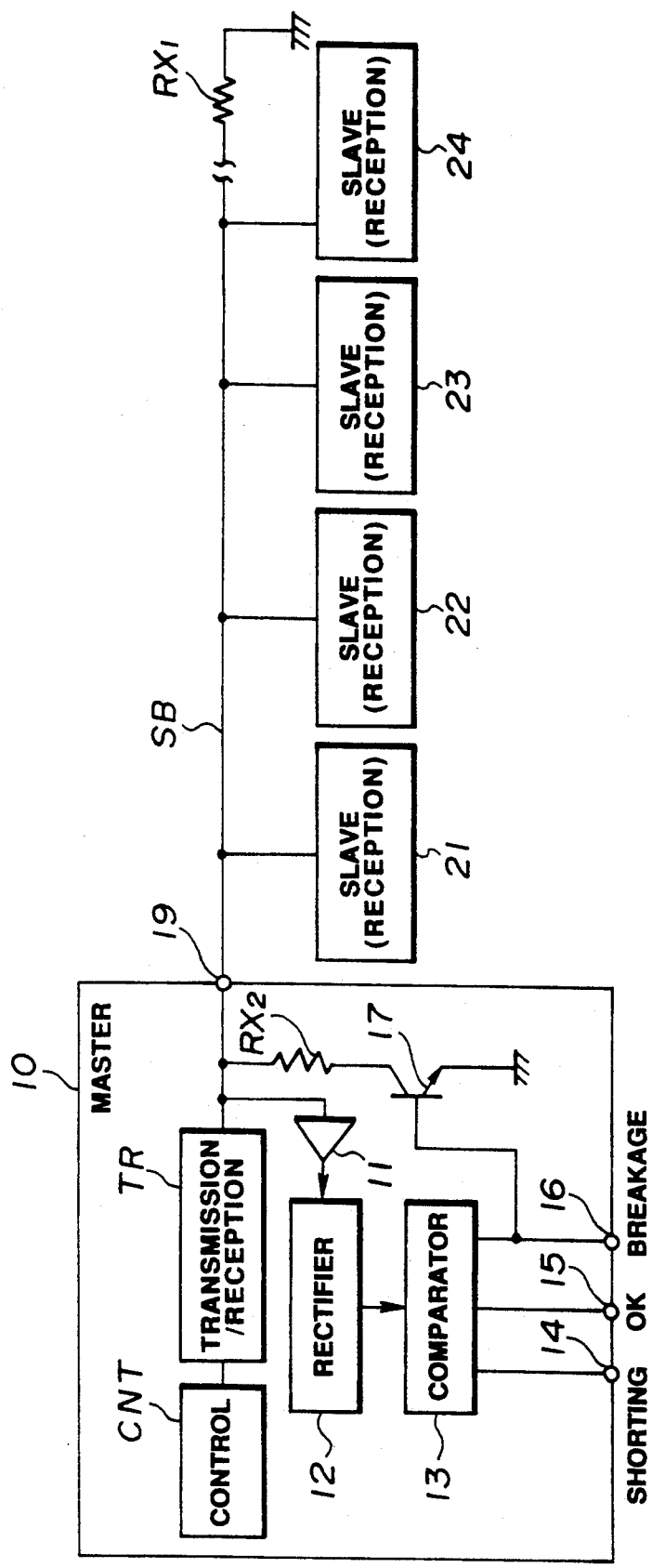
FIG. 10 is a block diagram showing a modified embodiment of a self-diagnosis circuit of the matrix switching apparatus of the present invention.

Referring to FIG. 10, there will be described a self-diagnosis circuit for detecting possible shorting or breakage of a serial busline interconnecting the matrix switching unit MSU and remote control unit RCU.

It is noted that each unit of the present matrix switching apparatus includes a buffer 11 and a rectifier 12 as a means for detecting the level of a predetermined portion of the transmission signal transmitted over the external serial busline SB. Details of the transmission signals will be explained below. The present matrix switching apparatus also includes a comparator (window comparator) 13 as a means for detecting the occurrence of malfunctions on the transmission line between secondary stations 21 to 24 and primary station 10 over external serial busline SB, such as breakage of serial busline SB or shorting of the transmission lines. The present matrix switching apparatus also includes a transistor 17 as resistance inserting means for inserting a terminal resistor $RX_2$ on the transmission lines, responsive to the output from said comparator 13, if a malfunction of external serial busline SB has been found by the detecting means. It is noted that, in FIG. 10, a line extending from the transmission/reception circuit TR to terminal 19 is assumed to be a part of external serial busline SB.

Meanwhile, the above mentioned predetermined portion of the transmission signal is a carrier transmitted for e.g. 1 msec for each of 10 to 20 polling operations as will be explained below. The carrier is a burst signal that does not affect the control operation in each unit so that there is no risk of malfunction of the units caused by the carrier. For a transmission voltage of 5V, this transmission signal is of the order of $2V \pm 0.5V$ with a terminal resistance of 75 ohms.

The buffer 11 is operated at the time of transmission of the carrier to pass the carrier therethrough to the rectifier 12, where the carrier is rectified to find the carrier level. The resulting level output is transmitted to the comparator 13.

The terminal resistor $RX_1$, having a resistance of 75 ohms as described above, is connected to the terminal end of external serial busline SB. Thus the usual voltage level of the carrier is $2V \pm 0.5V$. If the external serial busline SB should be broken between the secondary stations 23 and 24, for example, a state is reached in which the terminal resistor RX has been eliminated. In this case, the voltage level of the transmission line on the external serial busline SB is equal to the transmission voltage, or 5V. If shorting has occurred on one of the transmission lines, the voltage level of the transmission signal on the external serial busline SB is equal to the grounding voltage or 0V.

In this manner, by comparing the carrier voltage level transmitted from the rectifier 12 and the voltages $2V \pm 0.5V$, 5V and 0V at the comparator 13, malfunctions on the transmission line may be detected in association with the respective voltage levels. If the carrier voltage level is less than $2V \pm 0.5V$, the transmission line is determined to be free of malfunctions. If the carrier voltage level is approximately 5V, line breakage is assumed to have occurred somewhere on external serial busline SB. On the other hand, if the carrier voltage level is approximately 0V, shorting is assumed to have occurred on one of the transmission lines. A corresponding signal for shorting is outputted via terminal 14, while a corresponding signal for an error-free state is outputted via terminal 15 and a signal for line breakage is outputted via terminal 16.

The function of the rectifier $I_2$ and the comparator 13 in detecting malfunctions may also be realized by a digital to analog converter by means of which an output from the buffer 11 may be converted into analog signals so that malfunctions may be detected in accordance with the level of the analog signals.

Furthermore, with the present apparatus, if it is found by the comparator 13 that the carrier voltage level is about 5V so that line breakage has occurred somewhere in external serial busline SB, a signal at terminal 16 indicating such line breakage is supplied to the base of a transistor 17 functioning as resistance inserting means. Transistor 17 has its emitter grounded while having its collector connected to external serial busline SB via a resistor $RX_2$ having the same resistance as the terminal resistor $RX_1$, or 75 ohms. Thus, if line breakage has been detected and transistor 17 is turned on, external serial busline SB is grounded via resistor $RX_2$. That is, if line breakage should occur somewhere in external serial busline so that the transmission signal becomes 5V, resistor $RX_2$ is in circuit and functions as a terminal resistor and hence the voltage level of the transmission signal is restored to its normal level of $2V \pm 0.5V$. In this manner, the part of external serial busline SB upstream of the point of breakage may be used normally despite the occurrence of the line breakage.

Although not shown, the signals from terminals 14 to 16 are transmitted to an alarm display means that indicates malfunctions by, for example, a visual or audible alarm. In this manner, occurring on the transmission line, such as breakage or shorting, may be promptly found by an operator at a control center. Normal operation of the apparatus may also be confirmed by the signal at the terminal 15 which indicates normal operation. The above described arrangement for detecting malfunctions may also be provided within the above mentioned alarm display means.

With the present embodiment, since the units upstream of the point of line breakage may continue to function normally despite line breakage of external serial busline SB, it becomes possible to locate the point of breakage. That is, since external serial busline is known not to be broken as far as the remotest unit that responds to the aforementioned polling, it may be determined that line breakage has occurred downstream of that remotest responding unit.

Although the arrangement for detecting malfunctions is provided in FIG. 10 in all of the primary and secondary units, it is also possible to provide such arrangement in only one of the units.

With the above described matrix switching apparatus of the present embodiment, since malfunctions on the transmission line between the transmission/reception circuits may be detected by the comparator 13, it becomes possible to detect malfunctions on the transmission line, such as line breakage or shorting, or normal operation. In addition, since the terminal resistor is added to the transmission line as a result of detecting malfunctions occurring on the transmission line, it becomes possible to remedy breakage of the external serial busline SB.

Secondary stations 21 to 24 and primary station 10 of FIG. 10, are matrix switching units and remote control units, as explained hereinabove.

In this manner, with the matrix switching apparatus of the present invention, malfunctions may be located in the transmission lines between the transmission/reception circuits by detecting the signal level of a predetermined portion of the transmission signals transmitted over the external serial busline. Moreover, by inserting a terminal resistance to the transmission line based on detection of malfunctions occurring on the transmission lines, it becomes possible to take steps to permit normal communication even after breakage of the control busline.

What is claimed is:

1. A matrix switching apparatus comprising: a plurality of switching units connected in tandem and each including a plurality of input terminals and a plurality of output terminals, and crosspoint switches connected between said input terminals and said output terminals,
   a plurality of controlling means, each provided within a respective one of said switching units for controlling the turning on and off of said crosspoint switches connected to the respective input and output terminals,
   a remote control unit for transmitting switching data,
   a serial busline, and
   a plurality of transmission/reception means each provided within said switching units and said remote control unit and connected to said busline for controlling transmission of said switching data between said switching units and the remote control unit, a first one of said transmission/reception means being set to a master station mode and the remaining ones of said transmission/reception means being set to a slave station mode, said first one of said transmission/reception means sequentially polling the remaining ones of said transmission/reception means to prompt output of switching data by said polled transmission/reception means and for collectively transmitting the output switching data over said serial busline, the remaining ones of said transmission/reception means receiving only relevant data from the switching data transmitted by said first one over said serial busline and transmitting the relevant data to their respective controlling means.

2. The matrix switching apparatus as in claim 1 wherein said switching data are transmitted in the form of plural blocks, each of said blocks including master/slave discriminating data indicating the mode of said transmission/reception means outputting said blocks.

3. The matrix switching apparatus as in claim 1 wherein said switching data are transmitted in the form of plural blocks and wherein the last one of said blocks including the last data of the switching data includes continuity discriminating data indicating that the block is the last block.

4. The matrix switching apparatus as in claim 1 further comprising:
   a plurality of signal detection means each provided in a respective one of said switching units for detecting the presence or absence of information signals supplied to said input terminals and the presence or absence of information signals outputted from said output terminals and for providing signal detection data corresponding to said detected presence or absence, and
   a plurality of error detection means each provided within a respective one of said switching units for detecting the presence or absence of errors in switching states of said crosspoint switches based on said switching data and said signal detection data.

5. The matrix switching apparatus as in claim 1 further comprising:
   a plurality of alarm means each provided in a respective one of said switching units and responsive to a respective one of said error detection means for providing an alarm upon detection of an error by said error detection means.

6. The matrix switching apparatus in claim 1 further comprising:
   a plurality of input signal format detection means each provided in a respective one of said switching units for detecting signal formats of external equipment respectively connected to each of said input terminals,
   a plurality of output signal format detection means each provided in a respective one of said switching units for detecting signal formats of external equipment respectively connected to each of said output terminals, and
   switch inhibition means, connected to said input and output signal format detection means, for inhibiting interconnection of respective input and output terminals when incompatible signal formats are detected on said terminals.

7. A matrix switching apparatus as in claim 6 wherein said switch inhibition means comprises alarm means for issuing an alarm when incompatible formats are detected on said terminals.

8. The matrix switching apparatus as in claim 1 further comprising:
   level detection means for detecting a signal level of said serial busline,
   comparator means for comparing the signal level detected by said detection means and a reference level, and
   alarm means, responsive to said comparator means, for issuing an alarm when said signal level differs from said reference level.

9. The matrix switching apparatus as in claim 1 further comprising:
   level detection means for detecting a signal level of said serial busline,
   comparator means for comparing the detected signal level with a reference level, and
   resistance inserting means, responsive to said comparator means, for inserting a terminal resistance onto said serial busline.

10. A matrix switching apparatus comprising: a plurality of switching units connected in tandem and each including a plurality of input terminals and a plurality of output terminals, and crosspoint switches connected between said input terminals and said output terminals,
    a plurality of controlling means, each provided within a respective one of said switching units for controlling the turning on and off of said crosspoint switches connected to the respective input and output terminals,
    a remote control unit for transmitting switching data,
    a plurality of transmission/reception means each provided within said switching units and said remote control unit for controlling transmission of said switching data between said switching units and the remote control unit,
    a serial busline connected to said transmission/reception mans, and
    a plurality of mode setting means provided in said switching units and said remote control unit for selectively setting an operating mode of said transmission/reception means to a master station mode or a slave station mode, a first one of said transmission/reception means set to said master station mode sequentially polling the remaining ones of said transmission/reception means set to said slave station mode to prompt output of switching data by said polled transmission/reception means and for collectively outputting the output switching data over said serial busline, said remaining ones of said transmission/reception means set to said slave station mode receiving only relevant data form the switching data transmitted by said first one over said serial busline and supplying the received data to their respective controlling means.

* * * * *